United States Patent
Park et al.

(10) Patent No.: US 12,074,323 B2
(45) Date of Patent: *Aug. 27, 2024

(54) ANODE FOR LITHIUM ION SECONDARY BATTERY, METHOD FOR PREPARING THE SAME AND LITHIUM ION SECONDARY BATTERY COMPRISING THE SAME

(71) Applicant: SK On Co., Ltd., Seoul (KR)

(72) Inventors: Sung Jun Park, Daejeon (KR); Byoung Wook Jo, Daejeon (KR); Byung Chan Kang, Daejeon (KR); Yong Hee Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 56 days.

This patent is subject to a terminal disclaimer.

(21) Appl. No.: 17/584,876

(22) Filed: Jan. 26, 2022

(65) Prior Publication Data

US 2022/0149371 A1    May 12, 2022

Related U.S. Application Data

(63) Continuation of application No. 17/515,609, filed on Nov. 1, 2021.

(30) Foreign Application Priority Data

Nov. 2, 2020   (KR) .................. 10-2020-0144518

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0404* (2013.01); *H01M 4/0435* (2013.01);
(Continued)

(58) Field of Classification Search
CPC .......... H01M 10/052; H01M 10/0525; H01M 2004/021; H01M 2004/028;
(Continued)

(56) References Cited

U.S. PATENT DOCUMENTS

| | | |
|---|---|---|
| 5,888,670 A | 3/1999 | Kawakami |
| 2004/0072076 A1 | 4/2004 | Matsubara et al. |

(Continued)

FOREIGN PATENT DOCUMENTS

| | | |
|---|---|---|
| CN | 1937289 A | 3/2007 |
| CN | 101295781 A | 10/2008 |

(Continued)

OTHER PUBLICATIONS

Billaud et al., "Magnetically aligned graphite electrodes for high-rate performance Li-ion batteries", Nature Energy, Jul. 4, 2016, pp. 1-11, vol. 1, Article No. 16097.

*Primary Examiner* — Victoria H Lynch
(74) *Attorney, Agent, or Firm* — The Webb Law Firm

(57) ABSTRACT

The present disclosure relates to an anode for a secondary battery, a method of manufacturing the anode, and a lithium ion secondary battery including the anode. An anode includes an anode mixture layer on at least one surface of an anode current collector, with pores inside the anode mixture layer having a Z-tensor value of 0.33 or more. In addition, a method of manufacturing the anode and a lithium ion secondary battery including the anode are provided.

11 Claims, 3 Drawing Sheets

(51) Int. Cl.
*H01M 4/133* (2010.01)
*H01M 4/134* (2010.01)
*H01M 4/36* (2006.01)
*H01M 4/38* (2006.01)
*H01M 10/0525* (2010.01)
*H01M 50/171* (2021.01)
*H01M 4/02* (2006.01)

(52) U.S. Cl.
CPC ........... *H01M 4/133* (2013.01); *H01M 4/134* (2013.01); *H01M 4/366* (2013.01); *H01M 4/386* (2013.01); *H01M 10/0525* (2013.01); *H01M 50/171* (2021.01); *H01M 2004/021* (2013.01)

(58) Field of Classification Search
CPC .. H01M 4/0404; H01M 4/0435; H01M 4/133; H01M 4/134; H01M 4/1393; H01M 4/1395; H01M 4/366; H01M 4/386; H01M 4/583; H01M 4/587; H01M 4/621; H01M 4/624; H01M 50/171; Y02E 60/10
See application file for complete search history.

(56) References Cited

U.S. PATENT DOCUMENTS

| | | |
|---|---|---|
| 2006/0062717 A1 | 3/2006 | Tokuoka et al. |
| 2008/0268338 A1 | 10/2008 | Lee et al. |
| 2013/0255074 A1* | 10/2013 | Uchida ............... H01M 4/0404 29/623.5 |
| 2016/0093872 A1 | 3/2016 | Wood et al. |
| 2018/0123131 A1 | 5/2018 | Lee et al. |
| 2019/0334161 A1 | 10/2019 | Lee et al. |

FOREIGN PATENT DOCUMENTS

| | | |
|---|---|---|
| EP | 2793300 A1 | 10/2014 |
| EP | 3550639 A1 | 10/2019 |
| JP | H10321219 A | 12/1998 |
| JP | 2012129079 A | 7/2012 |
| KR | 20030052949 A | 6/2003 |
| KR | 20030052950 A | 6/2003 |
| KR | 1020150143790 A | 12/2015 |
| KR | 101972235 B1 | 8/2019 |

* cited by examiner (a) 3-D random    (b) planar random    (c) aligned

ANODE FOR LITHIUM ION SECONDARY BATTERY, METHOD FOR PREPARING THE SAME AND LITHIUM ION SECONDARY BATTERY COMPRISING THE SAME

CROSS-REFERENCE TO RELATED APPLICATIONS

This application is a continuation of U.S. patent application Ser. No. 17/515,609 filed on Nov. 1, 2021, which claims priority to Korean Patent Application No. 10-2020-0144518 filed Nov. 2, 2020, the disclosures of which are hereby incorporated by reference in their entireties.

BACKGROUND OF THE INVENTION

Field of the Invention

The present disclosure relates to an anode for a lithium ion secondary battery, and a method for preparing the anode, and a lithium ion secondary battery including the same.

Description of Related Art

In general, an anode for a lithium secondary battery is manufactured by applying an anode mixture manufactured including an anode active material, a conductive agent, a binder and a solvent to an anode current collector, drying the same, and rolling the same. In this process, an anode active material having an anisotropic structure is mainly oriented in a direction, parallel to the anode current collector (horizontal direction), and in a process in which a secondary battery is charged and discharged, lithium ions will be moved internally through pores formed between the anode active materials in a horizontal direction.

However, when lithium ions move through the pores formed in the horizontal direction, as loading of an electrode increases, a distance to move to an inside of the electrode increases significantly, resulting in an increase in resistance in a charging process. In particular, when charging is performed at a high C-rate, lithium salt (Li-plating) is formed on a surface of the electrode, and a cycle is repeated, resulting in a problem in which battery capacity decreases.

In this case, when an anode active material has an orientation in a direction, perpendicularly to the anode current collector (vertical direction), the formed pores may also be formed in the vertical direction, resulting in an effect of shortening a length of a passage through which lithium ions move internally. Thereby, resistance of the battery can be lowered, and in particular, charging and discharging efficiency at a high C-rate can be improved, thereby improving rapid charging performance.

Therefore, in a process of applying an anode mixture to a surface of an anode current collector, a technique, in which a magnetic field is applied to orient an anode active material vertically with respect to an anode current collector, and to control an XRD value of the anode active material in the finally obtained anode within a predetermined range, has been proposed. However, since the XRD value according to orientation of the anode active material itself is not a value for a movement path of lithium ions, there is a limit that is not directly related to the performance of the battery, and an alternative thereto is required.

SUMMARY OF THE INVENTION

The present disclosure is to improve battery performance by facilitating insertion and deintercalation of lithium ions, and is to provide an anode in which pores in an anode mixture layer are oriented perpendicularly to an anode current collector so as to directly improve battery performance, and a lithium ion secondary battery including the anode.

The present disclosure is to provide an anode for a lithium ion secondary battery that can directly determine battery performance through a degree of orientation of pores in an anode mixture layer, and a battery including the same.

Furthermore, an object of the present disclosure is to provide a method for aligning the pores in the anode mixture layer to be perpendicular to the anode current collector.

An object of the present disclosure is to provide a method of manufacturing an anode for a lithium ion secondary battery to directly determine battery performance through a degree of orientation of pores in an anode mixture layer.

According to the present disclosure, an anode for a lithium ion secondary battery is provided. The anode for a lithium ion secondary battery includes an anode mixture layer on at least one surface of an anode current collector, and pores in the anode mixture layer have a Z-tensor value of 0.33 or more.

The anode mixture layer may include at least one selected from a group consisting of artificial graphite, natural graphite, and silicon as an anode active material.

The anode active material may be at least one selected from a group consisting of amorphous, plate-like, flake-like, spherical, and fibrous shapes.

The anode mixture layer may include 94 to 98% by weight of an anode active material, 0.1 to 3% by weight of a conductive agent, and 1.5 to 3% by weight of a binder based on a total weight of the anode mixture layer.

The anode mixture layer may have electrode density of 1.50 g/cc or more on one side.

In addition, the present disclosure relates to a method for preparing an anode for a secondary battery, wherein the method includes operations of: forming an anode mixture layer by coating an anode mixture including an anode active material on at least one surface of an anode current collector (operation A); and changing orientation of the anode active material by applying a magnetic field to the anode mixture layer (operation B), wherein pores in the anode mixture may have a Z-tensor value of 0.33 or more.

The anode mixture preferably has viscosity in a range of 5,000 to 50,000 cp at a temperature of 25° C. and a shear rate of 0.1 s$^{-1}$.

A magnetic field is preferably applied to the anode mixture layer for a period of 1 second or more and 30 seconds or less.

The magnetic field applied to the anode mixture layer preferably has intensity of 1,000 Gauss or more and 25,000 Gauss or less.

The anode mixture may include 94 to 98% by weight of an anode active material, 0.1 to 3% by weight of a conductive agent, and 1.5 to 3% by weight of a binder based on a total weight of a solid content of the anode mixture.

The method for preparing the same may further include an operation of drying the anode mixture layer after operation B (operation C).

After operation B, the method for preparing the same may further include an operation of rolling the anode mixture layer (operation D), wherein the rolling may be performed so that electrode density of the anode mixture layer on one side is 1.50 g/cc or more.

Furthermore, in the present disclosure, a lithium ion secondary battery including an electrode assembly in which the anode as described above and a cathode including a cathode mixture layer on at least one surface of a cathode current collector are alternately stacked with a separator as a boundary, and a battery case in which the electrode assembly is accommodated and sealed, is provided.

The electrode density of the anode mixture layer on one side may be 1.50 g/cc or more.

BRIEF DESCRIPTION OF THE DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
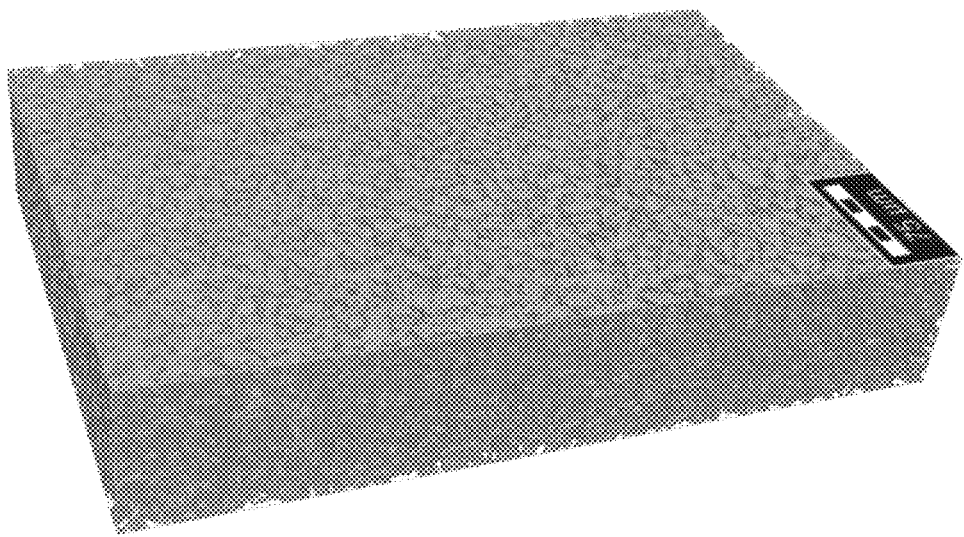
FIG. 1 is a three-dimensional (3D) image of a structure of an anode mixture layer obtained using an X-ray microscope.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, exemplary embodiments will be described with reference to various examples. However, embodiments of the present disclosure may be modified in various other forms, and the scope of the present disclosure is not limited to the embodiments described below.

In the present specification, when a part of a layer, film, region, plate, or the like is said to be "above" or "on" another part, which includes not only cases in which it is "directly on" another part, but also a case in which another part is interposed therebetween.

The present inventors have completed the present disclosure, focusing on the fact that a movement path of lithium ions is not an anode active material itself, but pores inside an anode mixture layer formed on an anode current collector.

That is, the present disclosure provides an anode for a secondary battery having a Z-tensor having a specific value obtained by evaluating an orientation tensor in each axial direction, after three-dimensionally imaging the pores inside the anode mixture layer formed by applying a magnetic field thereto using an X-ray microscope. That is, it is possible to provide a secondary battery having improved charging/discharging efficiency and rapid charging performance at a high rate by determining a degree of orientation of the electrode mixture layer, a movement path of lithium ions.

In the present disclosure, a 'vertical direction' means oriented at 90° with respect to the anode current collector, but is not limited to 90°, and for example, may mean oriented at 30° or more, more preferably oriented at 45° or more, and most preferably oriented at 60° or more.

In addition, that the pores are oriented in a vertical direction does not mean that all the pores should be vertically oriented, it means that the pores oriented in the vertical direction exist predominantly, and in the present disclosure, a degree to which the pores are oriented in a vertical direction with respect to a current collector may be expressed as a Z-tensor.

The anode for a lithium secondary battery of the present disclosure is an anode for a lithium ion secondary battery including an anode mixture layer on at least one surface of an anode current collector, wherein the pores within the anode mixture layer may have a Z-tensor value of 0.33 or more.

For measurement of the Z-tensor value, the pores inside the electrode may be imaged using an X-ray microscope for the cathode, the Z-tensor value may be derived from the obtained image of pores.

Figure 2:
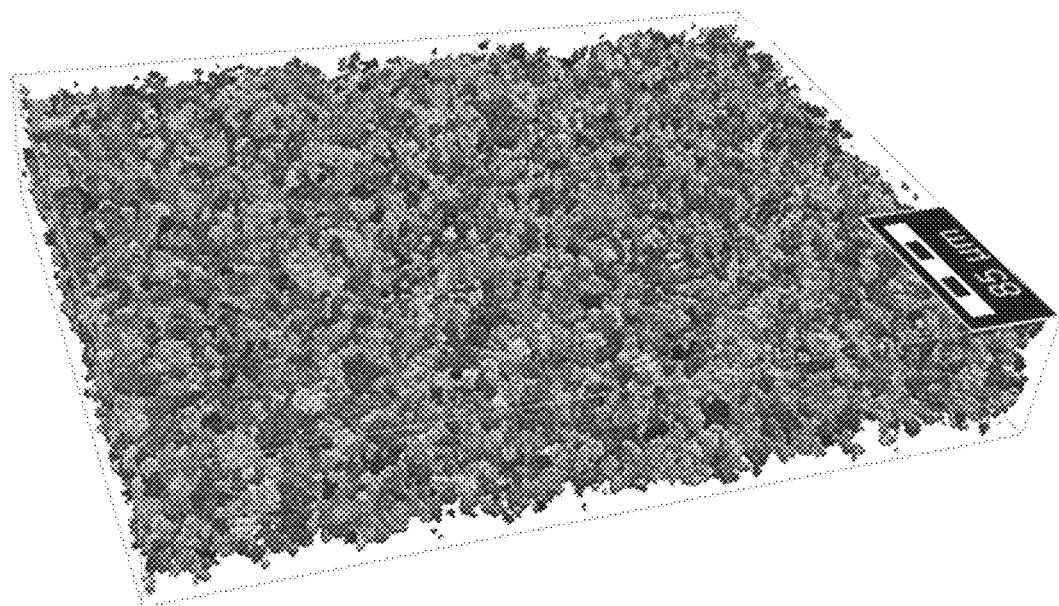
FIG. 2 is an image of a structure of pores within an anode mixture layer obtained by converting the 3D image of a structure of the anode mixture layer obtained in FIG. 1.

More specifically, when an X-ray microscope is used for an interior of an anode mixture layer, as shown in FIG. 1, a three-dimensional structure of the pores within the anode mixture layer can be obtained. Furthermore, it can be converted into a 3D image of the internal pore structure of the anode mixture layer as shown in FIG. 2, by 3D rendering from an image of the 3D structure inside the obtained anode mixture layer. As an apparatus capable of obtaining such a 3-D image, a facility including an X-ray source, a detector, and a lens capable of magnifying the source between the detectors may be used, and for example, the facility may be a Zeiss's Xraida 520 Versa. In addition, a software for the 3-D rendering may be GEODICT.

From the three-dimensional structure of the internal pores of the obtained anode mixture layer, a degree of orientation in each axial direction of each pore may be expressed as an orientation tensor. That is, the three dimensional structure for each pore may be evaluated in three axes of X, Y, and Z, and the sum of the tensors for the three axes in one object becomes '1', and the concept of this was schematically shown in FIG. 3.

Figure 3:
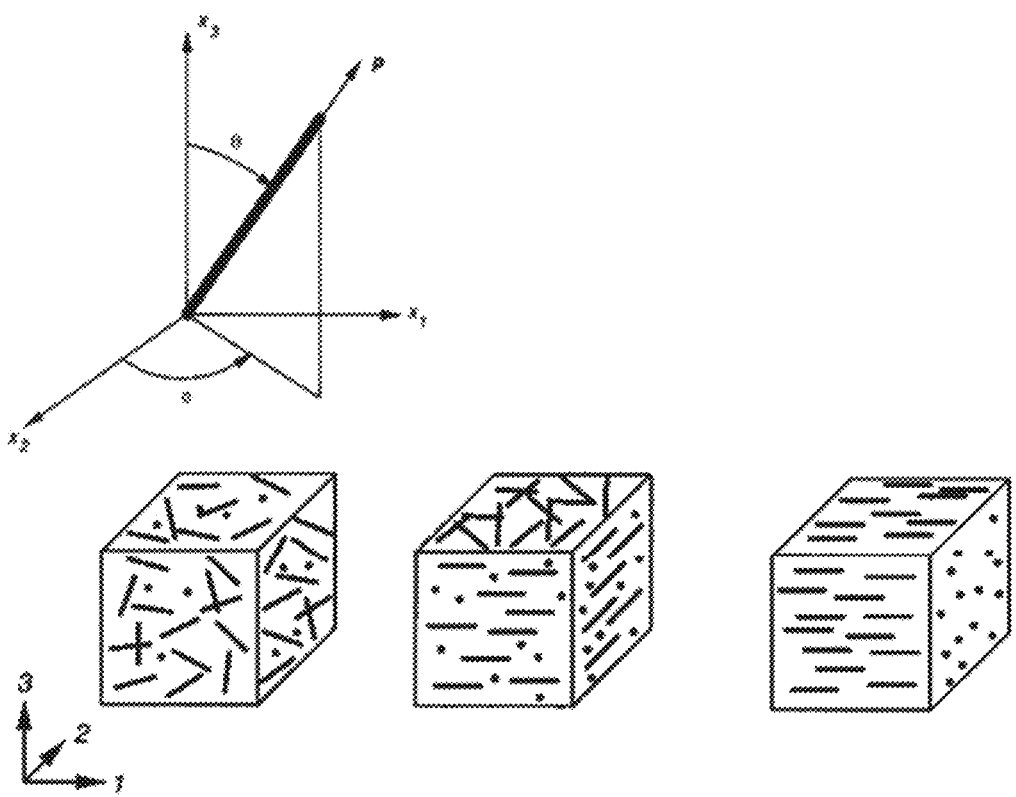
FIG. 3 is a diagram schematically illustrating a concept of an orientation tensor for evaluation a degree of orientation of pores within an anode mixture layer as a 3D structure, and in FIG. 3, (a) illustrates a case of pores being randomly oriented (3-D random) in all axial directions of X1, X2, and X3, (b) illustrates a case of pores being oriented on a plane formed by two axes of X1 and X2 (planar random), and (c) illustrates a case of pores being oriented and aligned in a direction of X1.

FIG. 3 illustrates a degree of orientation for any one object as an orientation tensor, in FIG. 3, (a) illustrates a case of being 3-D randomly oriented, (b) illustrates a case of pores being oriented in a plane formed by two axes of X1 and X2, that is, a case of pores 3-D randomly oriented (planar random) in one plane, and (c) illustrates a case of being oriented and aligned in an X1 axis direction.

The larger the orientation tensor value of a specific axis, the more it is oriented to the corresponding axis. That is, as the Z-tensor value increases, it can be evaluated that the orientation is developed in a direction of a Z-axis (corresponding to an X3 axis in FIG. 3).

Referring to FIG. 3, for example, when the X, Y, and Z-tensor values are 0.33, respectively, random orientation is shown in (a) of FIG. 3, and when the Z-tensor value is shown to be greater than 0.33, indicating that the anode active material tends to be oriented in a Z-axis direction, that is, perpendicularly to the anode current collector. That is, when the Z-tensor value is greater than 0.33, it may mean that pores oriented in the Z-axis direction in the anode mixture layer are predominantly formed.

In some cases, when the orientation along a specific axis is developed, that is, when a specific orientation tensor value exceeds 0.33, the shape along the corresponding axis is developed and the length from an object to the corresponding axis may be increased.

In the present disclosure, the Z-tensor value of the pores within the anode mixture layer preferably has a value of 0.33 or more. When the Z-tensor value of the pores or more, the orientation of the pores inside the anode mixture layer are oriented in a vertical direction with respect to the anode current collector, may be increased, thereby shortening a moving path of lithium ions. Therefore, insertion and deintercalation of lithium ions may be easily performed in a charging/discharging process, and accordingly, charging/discharging efficiency at a high rate can be improved to improve fast charging performance, and in addition, diffusion resistance of lithium ions into the electrode may be reduced during the charging/discharging process, thereby suppressing formation of lithium salts (Li-plating) on a surface of the electrode may be suppressed.

In the present disclosure, in order to improve the orientation of the pores in the anode mixture layer in a vertical direction with respect to an anode current collector, a method of applying an anode mixture to the anode current collector, and applying a magnetic field thereto. After forming an anode mixture layer by applying the anode mixture to the anode current collector, the anode active material in the anode mixture layer may be oriented in a vertical direction, and further, pores oriented in a direction perpendicular to the anode current collector may be developed in the anode mixture layer.

In this case, the application of the magnetic field may be controlled by checking a change in the orientation of the anode active material and the pores according to the intensity of the magnetic field, the application time of the magnetic field, and the viscosity of the anode mixture.

The application of the magnetic field may be performed under the conditions that a magnetic field having intensity in a range of 1,000 Gauss or more and 25,000 Gauss or less, for example, a magnetic field having intensity in a range of 2,000 Gauss or more, 15,000 Gauss or less, or 2,500 Gauss or more and 7,500 Gauss or less, is applied for 1 second or more, 30 seconds or less, for example, 1 second or more and 10 seconds or less.

In this case, the anode mixture preferably has viscosity of 5,000 cp or more and 50,000 cp or less, based on measurement at a temperature of 25° C. and a shear rate of 0.1 s$^{-1}$. When the viscosity of the anode mixture is less than 5,000 cp, it is advantageous in terms of self-alignment of the anode active material and may increase orientation of the pores, but there may be a problem in that an active material in the slurry easily precipitates because the viscosity may be too low, and when the viscosity thereof exceeds 50,000 cp, it may be difficult to orient the anode active material and the pores by applying a magnetic field, and there is a problem in that coating processability is deteriorated because the viscosity is too high. That is, as the anode slurry has viscosity of 5,000 cp or more, 50,000 cp or less, and preferably 30,000 cp at a temperature of 25° C. and a shear rate of 0.1 s$^{-1}$, an effect of inhibiting precipitation of the active material and a self-alignment effect of the active material and the pores may be simultaneously obtained.

In addition, as the viscosity is lower within the aforementioned viscosity range, resistance to a flow of the anode mixture decrease even if a magnetic field intensity and a magnetic field application time are the same, and accordingly, it is easy to increase orientation in a vertical direction of the anode active material with respect to the current collector, such that it may be advantageous to manufacture the pores in the anode mixture layer to have a Z-tensor value of 0.33 or more.

In the present disclosure, the anode mixture may include an anode active material, a conductive agent, a binder, and water as a solvent, and may further include a thickener, and the like, if necessary.

As the anode active material, a carbon-based anode active material may be used. The carbon-based anode active material is not particularly limited, as long as it is commonly used in manufacturing an anode for a lithium ion secondary battery, and may be suitably used in the present disclosure, but may be artificial graphite or a mixture of artificial graphite and natural graphite. When a crystalline carbon-based material, artificial graphite or a mixture of artificial graphite and natural graphite, is used as the anode active material, crystallographic properties of particles are more developed as compared to the case of using an amorphous carbon-based active material, it is possible to further improve orientation properties of the carbon material in an electrode plate with respect to an external magnetic field, thereby improving orientation of the pores.

A form of the artificial graphite or natural graphite may be amorphous, plate-like, flake-like, spherical or fibrous, and may also be a combination of two or more thereof. In addition, when the artificial graphite and natural graphite are mixed and used, a mixing ratio thereof may be 70:30 to 95:5 by weight.

In addition, the anode active material may further include at least one of a Si-based anode active material, and a Sn-based anode active material or a lithium vanadium oxide anode active material, together with the carbon-based anode active material. When the anode active material further includes the same, it may be included in a range of 1 to 50 wt % based on a total weight of the anode active material.

The Si-based anode active material may be Si, a Si—C composite, $SiO_x(0<x<2)$, and a Si-Q alloy, wherein Q is an element, other than Si, selected from a group consisting of alkali metals, alkaline earth metals, group 13 elements, group 14 elements, group 15 elements, group 16 elements, transition metals, rare earth elements, and combinations thereof, and specifically, may be selected from a group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and combinations thereof.

The Sn-based anode active material may be Sn, $SnO_2$, a Sn—R alloy, wherein R is not Sn and Si, and is an element selected from a group consisting of alkali metals, alkaline earth metals, group 13 elements, group 14 elements, group 15 elements, group 16 elements, transition metals, rare earth elements, and combinations thereof, and specifically, may be selected from a group consisting of Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Tl, Ge, P, As, Sb, Bi, S, Se, Te, Po, and combinations thereof. In addition, at least one of these and $SiO_2$ may be mixed and used.

The anode active material may be included in an amount of 94 to 98% by weight based on a solid content of the anode mixture.

In an embodiment, the anode mixture includes a binder. The binder serves to bind anode active material particles to each other, and also to bind the anode active material an anode current collector. As the binder, an aqueous binder may be used.

The aqueous binder may include styrene butadiene rubber acrylated styrene-butadiene rubber (SBR), acrylonitrile-butadiene rubber, acrylic rubber, butyl rubber, ethylene-propylene copolymer, polyepichlorohydrin, polyphosphazene, polyacrylonitrile, polystyrene, ethylene-propylene-diene copolymer, polyvinylpyridine, chlorosulfonated polyethylene, latex, a polyester resin, an acrylic resin, a phenolic resin, an epoxy resin, a polyvinyl alcohol resin, an acrylate-based resin, or combinations thereof.

The content of the binder in the anode active material layer may be 1.5 to 3 wt % based on a solid content of the anode mixture.

Together with the binder, a thickener may be further included to impart viscosity. The thickener may include a cellulose-based compound, for example, carboxymethyl cellulose, hydroxypropyl methyl cellulose, methyl cellulose, or alkali metal salts thereof may be used by mixing one or more kinds thereof. As the alkali metal, Na, K or Li may be used. The thickener may be 0.1 parts by weight to 3 parts by weight based on 100 parts by weight of the anode active material.

The conductive agent is used to impart conductivity to an electrode, and may be used without limitation as long as it is commonly used in secondary batteries, for example, may include a carbon-based material such as natural graphite, artificial graphite, carbon black, acetylene black, Ketjen black, carbon fiber, or the like; a metal-based material such as metal powders such as copper, nickel, aluminum, silver, and the like, or metal fibers; a conductive polymer such as polyphenylene derivatives, or the like; or a conductive material including a mixture thereof.

The conductive agent may be used in an amount of 0.1 to 3% by weight based on a solid weight of an anode mixture.

As the anode current collector, one selected from a group consisting of copper foil, nickel foil, stainless steel foil, titanium foil, stainless steel foil, titanium foil, nickel foam, copper foam, a polymer substrate coated with conductive metal, and combinations thereof may be used. The thickness of the anode current collector is not particularly limited, and may be, for example, 5 to 30 μm.

As described above, by applying an anode mixture to at least one surface of an anode current collector, applying a magnetic field to orient an anode active material and pores, and then drying and rolling the same, an anode having an anode mixture layer formed on the anode current collector may be manufactured.

The drying process is for removing a solvent included in the anode mixture, and a drying means is not particularly limited, and a conventional drying means may be applied, for example, heating-drying such as hot-air drying may be mentioned.

The drying process is not particularly limited, but may be performed for example, within a range of 60 to 180° C., preferably within a range of 70 to 150° C. for 20 to 300 seconds, for example, for 40 to 240 seconds, and for 60 to 200 seconds.

A rolling process may be performed after the drying process, and a thickness or density of the anode mixture layer may be adjusted through the rolling process. Conventional methods such as a roll press method and a flat plate press method can be used for the rolling treatment, and the thickness of the anode mixture layer may be 20 μm or more and 120 μm or less per one side by the rolling process, for example, 40 μm or more, 100 μm or less, or 60 μm or more and 80 μm or less.

Meanwhile, since the present disclosure may be suitably applied to an electrode having high density having an anode mixture layer having density of 1.5 $g/cm^3$ or more, and rolling may be performed to 1.5 $g/cm^3$ or more, and may be performed to, for example, 1.5 $g/cm^3$ or more, 2.2 $g/cm^3$ or less, or 1.5 $g/cm^3$ or more, and 2.0 $g/cm^3$ or less.

The anode according to the present disclosure facilitates diffusion of lithium ions into an electrode through the anode active material and the pores, especially when the pores are oriented in a direction perpendicular to the anode current collector, thereby improving charging/discharging efficiency at high rate, and improving rapid charging performance.

The anode including the pores with the developed vertical orientation in a vertical direction obtained by the present disclosure and a cathode may be alternately stacked with a separator as a boundary, and then inserted and sealed in a battery case and an electrolyte may be injected thereto to manufacture a lithium ion secondary battery.

Hereinafter, a cathode will be described in more detail. The cathode is not particularly limited, but a cathode mixture layer is formed by applying a cathode mixture to at least one surface of a cathode current collector, drying and rolling the same, and any cathode commonly used in secondary batteries can be suitably used in the present disclosure.

The cathode mixture may include a cathode active material, a binder, and a solvent, and if necessary, a conductive agent, and may also include a thickener.

As the cathode active material, a compound capable of reversible insertion and deintercalation of lithium (a lithiated intercalation compound) may be used. Specifically, at least one of complex oxides of lithium and metal selected from cobalt, manganese, nickel, and combinations thereof may be used.

A more specific example may be a lithium transition metal compound (oxide) having a layered structure as represented by the general formula $LiMO_2$, wherein M includes at least one of transition metal elements such as Ni, Co, and Mn, and may further include another metal element or a non-metal element. The composite oxide, may be for example, a monolithic lithium transition metal composite oxide containing one type of the transition metal element, a so-called binary lithium transition metal composite oxide containing two types of the above transition metal element, and a ternary lithium transition metal composite oxide containing Ni, Co, and Mn as a constituent element, as a transition metal element, and as the composite oxide, a ternary lithium transition metal composite oxide such as $Li(Ni_{1/3}Co_{1/3}Mn_{1/3})O_2$ is preferable.

In addition, as a lithium transition metal compound (oxide) represented by general formula $Li_2MO_3$, wherein M may include at least one of transition metal elements such as Mn, Fe, Co, and may further include another metal element or a non-metal element, for example, $Li_2MnO_3$, $Li_2PtO_3$, and the like.

In addition, it may be a solid solution of $LiMO_2$ and $Li_2MO_3$, for example, a solid solution represented by $0.5LiNiMnCoO_2$-$0.5Li_2MnO_3$.

Furthermore, a material having a coating layer on a surface of the cathode active material may be used, or a mixture of the compound and a compound having a coating layer may be used. The coating layer may include at least one coating element compound selected from a group consisting of oxide, hydroxide, oxyhydroxide, oxycarbonate, and hydroxycarbonate of a coating element. The compound constituting these coating layers may be amorphous or crystalline. As the coating element included in the coating layer, Mg, Al, Co, K, Na, Ca, Si, Ti, V, Sn, Ge, Ga, B, As, Zr, or a mixture thereof may be used.

In the cathode, the cathode active material may be 90 to 98% by weight based on a solid content of a cathode mixture.

The binder serves to bind cathode active material particles to each other, and bind the cathode active material to a cathode current collector, and may be in an amount of 1.5 to 5% by weight based on the solid content of the cathode mixture. The binder may be, for example, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinyl Pyrrolidone, polyurethane, polytetrafluoroethylene, polyvinylidene fluoride, polyethylene, polypropylene, styrene-butadiene rubber, acrylated styrene-butadiene rubber, an epoxy resin, nylon, and the like.

Together with the binder, a thickener may be further included to impart viscosity. The thickener may be the same as the thickener included in the anode mixture, and may be included in an amount of 0.1 to 3 parts by weight based on 100 parts by weight of the cathode active material.

The conductive agent is used to impart conductivity to a cathode, and any electro conductive material commonly used in the cathode of the secondary battery may be suitably used, and the conductive agent used in the anode mixture may be used. The conductive agent may be used in an amount of 0.1 to 5% by weight based on a solid content of the cathode mixture.

The solvent may be an aqueous solvent such as water, as well as a non-aqueous solvent. The non-aqueous solvent may be used in the present disclosure as long as it is commonly used in the preparation of a cathode mixture for a secondary battery, for example, N-methyl-2-pyrrolidone (NMP), but is not limited thereto.

As a cathode current collector, metal having good conductivity, for example, aluminum, nickel, titanium, stainless steel, and the like, may be used, and the cathode current collector may have various forms such as a sheet type, a thin type, and a mesh type. The thickness of the cathode current collector is not particularly limited, and may be 5 to 30 µm.

As described above, a cathode having a cathode mixture layer formed on a cathode current collector may be manufactured by applying a cathode mixture to at least one surface of the cathode current collector, and drying and rolling the same.

The drying and rolling process may be performed by the same method as that of manufacturing the anode, and a detailed description thereof will be omitted.

A separator interposed between the cathode and the anode may be a porous sheet or nonwoven fabric, and the like, and may be a multilayer film of polyethylene, polypropylene, polyvinylidene fluoride or two or more layers thereof, a mixed multilayer film of two layers of polyethylene/polypropylene, a mixed multilayer film of three layers of polyethylene/polypropylene/polyethylene, a mixed multilayer film of three layers of polypropylene/polyethylene/polypropylene, and the like, and furthermore, the separator may be provided with a porous heat-resistant layer on one side or both sides of the porous sheet or nonwoven fabric, or the like. The separator is not particularly limited, but, for example, the separator may have a thickness of about 10 to 40 µm.

The electrolyte includes a non-aqueous organic solvent and a lithium salt. The non-aqueous organic solvent serves as a medium through which ions involved in an electrochemical reaction of a battery can move, for example, and the organic solvent may be carbonate-based, ester-based, ether-based, ketone-based, alcohol-based, or aprotic solvent. The non-aqueous organic solvent may be commonly used in lithium ion secondary batteries, and the organic solvents may be used alone or in combination of one or more thereof.

The lithium salt is dissolved in an organic solvent, serves as a supply source of lithium ions in the battery, enables a basic operation of lithium secondary batteries, and promotes movement of lithium ions between the cathode and the anode. For example, as the lithium salt, one or two or more elements selected from a group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are each independently an integer from 1 to 20), LiCl, and LiI and $LiB(C_2O_4)_2$(lithium bis(oxalato) borate:LiBOB) may be used. A concentration of the lithium salt is not particularly limited, but may be used within a range of 0.1M to 2.0M.

The electrolyte may further include vinylene carbonate or an ethylene carbonate-based compound as needed to improve battery life. That is, as the anode according to the present disclosure, the secondary battery including an anode for a lithium secondary battery in which orientation of the pores in the anode mixture layer is dominant in a Z-axis, that is, the pores within the anode mixture layer have a Z-tensor value of 0.33 or more, facilitates diffusion of lithium ions in the electrode during the charging and discharging process, thereby lowering the resistance of the battery, and in particular, improving charging and discharging efficiency at a high rate, thereby improving lifespan characteristics and rapid charging performance.

Example

The electrolyte may further include a vinylene carbonate or an ethylene carbonate-based compound as needed to improve battery life. That is, as the anode according to the present disclosure, the secondary battery including an anode for a lithium secondary battery in which orientation of the pores in the anode mixture layer is dominant in a Z-axis, that is, the pores within the anode mixture layer have a Z-tensor value of 0.33 or more, facilitates diffusion of lithium ions in the electrode during the charging and discharging process, thereby lowering the resistance of the battery, and in particular, improving charging and discharging efficiency at a high rate, thereby improving cycle life characteristics and rapid charging performance.

Examples 1 to 4 and Comparative Examples 1 to 5

An anode mixture was manufactured by mixing 89.3 wt % of artificial graphite, 5 wt % of silicon oxide, 1.5 wt % of styrene butadiene rubber, and 1.2 wt % of carboxymethyl-cellulose 1.2 CNT in water. In this case, viscosity of the anode mixture is as shown in Table 1 at a temperature of 25° C. and a shear rate of $0.1 \, s^{-1}$.

The manufactured anode mixture was coated on top and bottom surfaces of an anode current collector of Cu foil, and the anode current collector was passed between a pair of neodymium magnets in which a magnetic field of 4,000 Gauss was formed. In this case, by changing a moving speed of the anode current collector coated with the anode mixture, a time for which the magnetic field is applied as shown in Table 1 was adjusted, followed by drying and rolling to manufacture an anode. However, in Comparative Example 1, a magnetic field was not applied.

The manufactured anode was evaluated for 3-D Z-tensor values of pores using an X-ray microscope (Xraida 520 Versa, 3D rendering software: GEODICT, manufactured by Zeiss), and results thereof are shown in Table 1.

A cathode mixture was manufactured by mixing 96% by weight of a cathode active material of $Li(Ni_{0.8}Co_{0.1}Mn_{0.1})O_2$, 2% by weight of a CNT conductive agent, and 2% by weight of a polyvinylidene fluoride binder in an N-methylpyrrolidone solvent. Using the manufactured anode mixture, Al foil was coated on both surfaces of the cathode current collector, and then dried and rolled to manufacture a cathode.

The manufactured anode and a cathode are alternately stacked with a separator as a boundary, inserted into a pouch, sealed, and then a mixed solvent of ethylene carbonate and diethyl carbonate (50:50 volume ratio), in which 1M $LiPF_6$ is dissolved (in a 50:50 volume ratio), was injected to manufacture a lithium ion secondary battery.

Charging (2.5C) and discharging (0.3C) at a high C-rate were repeated for each of the manufactured secondary batteries, and a capacity retention rate was measured at 100 cycles and 300 cycles, and results thereof are shown in Table 1. Furthermore, with respect to the lithium ion secondary batteries of Examples 1 and 3 and Comparative Examples 1, 4, and 5, a change in a capacity retention rate according to the number of cycles was shown in FIG. 4.

As can be seen from Table 1, in Comparative Example 1 in which no magnetic field is applied to the anode mixture having the same viscosity as 29,290 cp and in Comparative Example 2 in which a magnetic field application time was as short as 0.5 seconds, a Z-tensor value was as low as 0.24 and 0.25, respectively. On the other hand, in Examples 1 to 4 in which a magnetic field application time was 1 second or longer, a Z-tensor value of pores within the anode mixture layer was as high as 0.33 or higher. In addition, it could be confirmed that Examples 1 to 4 exhibit a high capacity retention rate of 98% or more for up to 300 cycles.

Meanwhile, looking at the high rate charging/discharging cycle results, in a secondary battery of Comparative Examples 1 and 2 including the anode having a low Z-tensor value of 0.33 or less in the pores in the anode mixture layer, the capacitance retention rate at 300 cycles were less than 80%, and about 85%, respectively, indicating that the capacitance retention rate was significantly lowered to 95% or less. That is, in Examples 1 to 3, it was confirmed that the battery performance was improved as a degree of orientation of the pores in the anode mixture layer, a moving path of lithium ions, in a vertical direction with respect to a current collector developer.

Figure 4:
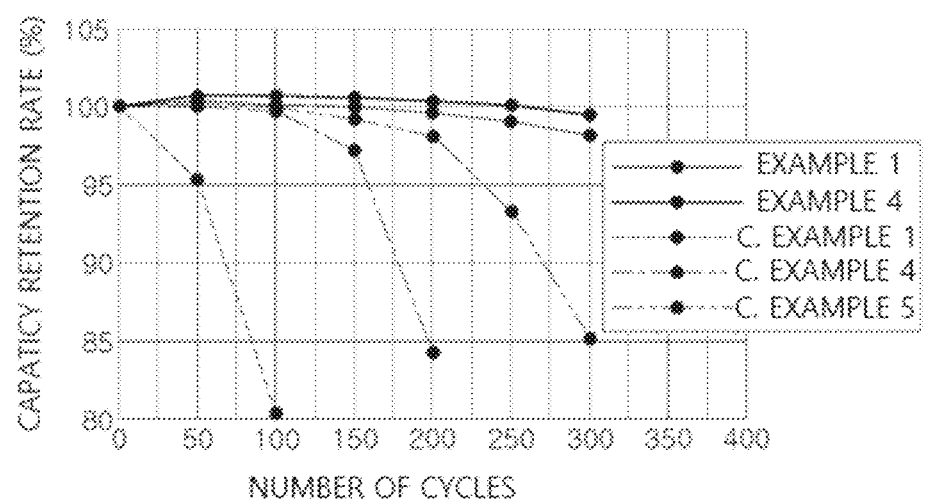
FIG. 4 is a graph illustrating changes in a capacity retention rate according to the number of cycles in the lithium ion secondary batteries obtained in Examples 1 and 4 and Comparative Examples 1, 4, and 5.

Furthermore, as can be seen from FIG. 4, in the secondary battery of Example 1 including the anode according to the present disclosure, the capacity retention rate is maintained to be substantially constant during 300 cycles of charging and discharging, while in the secondary battery of Comparative example 1 to which no magnetic field was applied, the capacity retention rate was abruptly decreased from the beginning of the charging/discharging cycle, and the capacity retention rate at 100 cycles was reduced to a level of 80%. Therefore, no further change in capacity was confirmed after 100 cycles.

The above-described results may be explained by shortening a moving distance of lithium ions, reducing diffusion resistance of lithium ions in the electrode during a charging process, and suppressing generation of lithium salts during charging at high rate, as vertical orientation and the degree in which the pores in the anode mixture layer are oriented in a Z-axis direction are improved.

In particular, the anode of Example 4 manufactured using an anode mixture having low viscosity had a higher value than that in the anode of Example 2 manufactured by applying a magnetic field for the same time, and the anode of Example 3 manufactured by applying a magnetic field for a longer time, and the lithium ion secondary battery of Example 4 had a capacity retention rate on a level of 99.5%

TABLE 1

| Classification | Viscosity of anode mixture (cp) (25° C., $0.1 \, s^{-1}$) | Magnetic field applied (application?) time (sec.) | Z-tensor | Capacity retention rate (%) (2.5C charging/0.3C discharging) | |
|---|---|---|---|---|---|
| | | | | 100 cycle | 300 cycle |
| Comparative example 1 | 29,290 | 0 (not applied) | 0.24 | 80.4 | <80.0 |
| Comparative example 2 | 29,290 | 0.5 | 0.25 | 100.0 | 85.2 |
| Example 1 | 29,290 | 1.0 | 0.34 | 100.1 | 98.2 |
| Example 2 | 29,290 | 4.0 | 0.33 | 100.4 | 98.9 |
| Example 3 | 29,290 | 8.0 | 0.33 | 100.3 | 99.1 |
| Example 4 | 11,500 | 4.0 | 0.42 | 100.7 | 99.5 |
| Comparative example 3 | 54,130 | 4.0 | 0.30 | 100.0 | 90.2 |
| Comparative example 4 | 77,210 | 4.0 | 0.25 | 99.8 | <80.0 |
| Comparative example 5 | 77,210 | 8.0 | 0.25 | 100.0 | 85.2 | at 300 cycles, confirming that the capacity retention rate was very high as compared to the lithium ion secondary batteries of Examples 2 and 3. In addition, as can be seen from FIG. 4, in the secondary battery of Example 4 including the anode according to the present disclosure, it could be seen that the capacity retention rate was maintained almost constant during 300 cycles of charging and discharging.

As described above, the results of battery performance are due to a difference in Z-tensor values. Even though a magnetic field of the same intensity is applied for a shorter time, the viscosity of the anode mixture is low, and the resistance to a flow of the anode mixture is reduced, so that the orientation in which the anode active material and the pores in the anode mixture layer are oriented in a vertical direction with respect to the current collector may be further improved.

On the other hand, when the anodes of Comparative Examples 3 to 5 manufactured using an anode mixture having a viscosity of 50,000 cp or more were vertically oriented by applying a magnetic field of the same intensity as in Example 4 for the same time, while a Z-tensor value was less than 0.33, it was evaluated that orientation in which the pores of the anode mixture layer were oriented in a vertical direction with respect to the anode current collector was not sufficiently developed.

It was confirmed that the lithium ion secondary batteries of Comparative Examples 3 to 5 including such an anode also significantly deteriorated to a level of 90.2% or less in a capacity retention rate at 300 cycles. In addition, as can be seen from FIG. 4, in the second batteries of Comparative Examples 4 and 5, the capacity retention rate rapidly decreased after 100 cycles. Comparative Example 4 showed a capacity retention rate of 85% or less at 200 cycles, and did not confirm a change in additional capacity, but was expected to have a capacitance retention rate of less than 80% at 300 cycles.

Meanwhile, comparing Comparative Examples 4 and 5, a Z-tensor value was not affected even if a magnetic field application time is increased while using the same mixture having the same viscosity, a result in which the Z-tensor value is not affected was shown.

Example 5 and Comparative Examples 6 to 8

An anode was manufactured in the same manner as in Example 1, except that viscosity of the anode mixture, and a magnetic field application time were adjusted as shown in Table 2, and a Z-tensor value was evaluated and results thereof are shown in Table 2.

In addition, in order to confirm a degree of orientation of an anode active material with respect to a surface of an anode current collector for the manufactured anode, XRD was measured, and results thereof are shown in Table 2.

Furthermore, after manufacturing a cathode and a lithium ion secondary battery in the same manner as in Example 1, a capacity retention rate was measured in the same manner as in Example 1 for each of the manufactured secondary batteries, and results thereof was shown in Table 2.

TABLE 2

| Classification | Viscosity of anode mixture (cp) (25° C., 0.1 s$^{-1}$) | Magnetic field application time(Sec.) | I(110)/I(002) | Z-tensor | Capacity retention rate(%) (2.5C charge/0.3C discharge) | |
|---|---|---|---|---|---|---|
| | | | | | 100 cycle | 300 cycle |
| Comparative Example 6 | 11,340 | 0(not applied) | 0.15 | 0.30 | 100 | 86.2 |
| Example 5 | 11,340 | 2 | 0.17 | 0.48 | 100 | 99.5 |
| Comparative Example 7 | 12,440 | 0(not applied) | 0.17 | 0.32 | 99 | 85.9 |
| Example 6 | 12,440 | 2 | 0.78 | 0.42 | 100 | 98.8 |

When I(110)/I(002) is 0.5(%) or more, it indicates that the anode active material is vertically oriented with respect to the anode current collector, and when I(110)/I(002) is closer to 0 (%), it indicates that the anode active material is horizontally oriented.

Comparing Example 5 and Comparative Example 6 in Table 2, a value of I(110)/I(002) is 0.15% before self-alignment and 0.17% after self-alignment. All of the corresponding values are 0.5% or less, which is a value to an extent that an anode active material oriented in a vertical direction with respect to the anode current collector, is not observed despite application of a magnetic field.

However, compared to the anode of Comparative Example 6, the Z-tensor value of the anode of Example 5 increased by 0.18, indicating that the pores in the anode mixture layer developed in a direction, perpendicularly to an anode current collector by application of a magnetic field. An increase in orientation of the pores by the application of the magnetic field may not be confirmed by an XRD analysis indicating that a degree of orientation of the anode active material, but may be confirmed from an evaluation of the Z-tensor value.

In this case, the anode of Example 5 has a Z-tensor value of 0.48, indicating that the pores oriented in a vertical direction of the anode current collector are predominantly present in the anode mixture layer, and the secondary battery including the anode has a capacity retention rate of 99.5%, indicating a significantly higher capacity retention rate compared to Comparative Example 6.

Meanwhile, comparing Comparative Example 8 and Comparative Example 7 of Table 2, in the case of I(110)/I(002), a ratio before self-alignment was 0.17%, whereas a ratio after self-alignment was applied, which can be seen that the value of I(110)/I(002) is changed by 0.5% or more.

In addition, the Z-tensor value of the anode of Comparative Example 8 increased by 0.1 with respect to the anode of Comparative Example 7, indicating that pores developed in a vertical direction of the anode current collector by the application of a magnetic field. In this case, the anode of Comparative Example 8 has a Z-tensor value of 0.42, indicating that the pores oriented in a vertical direction of the anode current collector are predominantly present in the anode mixture layer, and the secondary battery including such an anode had a capacity retention rate of 98.8%, which was significantly higher than that of Comparative Example 7.

From the results of Examples 5 and 6 and Comparative Examples 6 and 7 as described above, when a change in the degree of orientation of the anode active material is shown as I(110)/I(002) derived from XRD measurement, as a magnetic field is applied, from results obtained by analyzing a change in an XRD value and a change in a Z-tensor value, it can be seen that a value of I(110)/I(002) is not always directly related to battery performance.

On the other hand, when the pores oriented in the vertical direction of the anode current collector are developed in the anode mixture layer by the application of a magnetic field, a movement path of lithium ions might be shortened, thereby improving the battery performance. That is, it could be seen that the Z-tensor value related to the orientation of the pores within the anode mixture layer, a passage for lithium ions, rather than the orientation of the anode active material in the anode mixture layer, is a characteristic directly related to the battery performance.

As set forth above, in the anode for a lithium ion secondary battery according to the present disclosure, orientation in which pores within the anode mixture layer are oriented in a vertical direction with respect to the anode current collector may be increased, thereby facilitating insertion and deintercalation of lithium ions, thereby improving charging/discharging efficiency of and rapid charging performance of the lithium ion secondary battery at a high rate.

According to the method for manufacturing an anode for a lithium ion secondary battery according to the present disclosure, orientation in which pores within the anode mixture layer are oriented in a vertical direction with respect to an anode current collector may be increased, and thus, an anode having improved charging and discharging efficiency and rapid charging performance of the lithium ion secondary battery at a high rate may be manufactured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An anode for a lithium ion secondary battery, comprising:
   an anode mixture layer including an anode active material and a binder on at least one surface of an anode current collector,
   wherein pores inside the anode mixture layer have a Z-tensor value of 0.33 or more, and the anode active material of the anode mixture layer has an I(110)/I(002) value as determined by XRD of less than 0.50, and
   wherein the Z-tensor value is measured by:
   obtaining a three-dimensional structure inside the anode mixture layer using an X-ray microscope;
   three-dimensional rendering of an image of the three-dimensional structure inside the anode mixture layer to convert into a three-dimensional image of the internal pore structure of the anode mixture layer; and
   evaluating the three-dimensional structure for each pore in three axes of X, Y, and Z.

2. The anode for a lithium ion secondary battery of claim 1, wherein the anode mixture layer has electrode density of 1.50 $g/cm^3$ or more on one side.

3. The anode for a lithium ion secondary battery of claim 1, wherein the anode mixture layer has electrode density of 1.50 $g/cm^3$ or more and 2.2 $g/cm^3$ or less on one side.

4. The anode for a lithium ion secondary battery of claim 1, wherein the anode mixture layer has electrode density of 1.50 $g/cm^3$ or more and 2.0 $g/cm^3$ or less on one side.

5. The anode for a lithium ion secondary battery of claim 1, wherein the anode mixture layer comprises 94 to 98% by weight of an anode active material, 0.1 to 3% by weight of a conductive agent, and 1.5 to 3% by weight of a binder based on a total weight of the anode mixture layer.

6. The anode for a lithium ion secondary battery of claim 1, wherein the anode active material is artificial graphite, natural graphite, or a mixture thereof.

7. The anode for a lithium ion secondary battery of claim 6, wherein the anode active material is at least one selected from a group consisting of amorphous, plate-like, flake-like, spherical, and fibrous shapes.

8. The anode for a lithium ion secondary battery of claim 6, wherein the anode active material further comprises at least one selected from a group consisting of a silicon-based anode active material, a Sn-based anode active material, and a vanadium oxide.

9. The anode for a lithium ion secondary battery of claim 1, wherein the anode active material comprises artificial graphite and natural graphite, and the artificial graphite and natural graphite are mixed in a weight ratio of 70 to 95:5 to 30.

10. The anode for a lithium ion secondary battery of claim 9, wherein the anode active material further comprises at least one selected from a group consisting of a silicon-based anode active material, a Sn-based anode active material, and a vanadium oxide.

11. A secondary battery, comprising:
    a cathode; and
    the anode of claim 1.

* * * * *

UNITED STATES PATENT AND TRADEMARK OFFICE
CERTIFICATE OF CORRECTION

| | | |
|---|---|---|
| PATENT NO. | : 12,074,323 B2 | Page 1 of 1 |
| APPLICATION NO. | : 17/584876 | |
| DATED | : August 27, 2024 | |
| INVENTOR(S) | : Sung Jun Park et al. | |

It is certified that error appears in the above-identified patent and that said Letters Patent is hereby corrected as shown below:

In the Claims

Column 16, Line 10, Claim 1, delete "0.50," and insert -- 0.50%, --

Signed and Sealed this
Twelfth Day of August, 2025

Coke Morgan Stewart
*Acting Director of the United States Patent and Trademark Office*